(12) United States Patent
Perlman

(10) Patent No.: US 7,037,471 B1
(45) Date of Patent: May 2, 2006

(54) DISPOSABLE PAPER WEIGHING DISHES

(76) Inventor: Daniel Perlman, 94 Oakland Ave., Arlington, MA (US) 02476

( * ) Notice: Subject to any disclaimer, the term of this patent is extended or adjusted under 35 U.S.C. 154(b) by 187 days.

(21) Appl. No.: 10/708,192

(22) Filed: Feb. 14, 2004

(51) Int. Cl.
*B01L 3/00* (2006.01)
*G01G 23/00* (2006.01)

(52) U.S. Cl. ............... 422/102; 177/262; 177/264; 422/940; 422/944

(58) Field of Classification Search ........... 177/262, 177/264; 422/940, 944, 102
See application file for complete search history.

(56) References Cited

U.S. PATENT DOCUMENTS

| | | | | |
|---|---|---|---|---|
| 1,306,187 A | * | 6/1919 | Manischewitz | 177/246 |
| 1,344,802 A | * | 6/1920 | Lackner | 220/495.03 |
| 1,420,808 A | * | 6/1922 | Batdorf | 493/74 |
| 1,771,765 A | * | 7/1930 | Benson | 229/400 |
| 2,027,296 A | * | 1/1936 | Stuart et al. | 206/524.6 |
| 2,260,651 A | * | 10/1941 | Annen | 229/406 |
| 2,459,073 A | * | 1/1949 | Hamilton | 229/400 |
| 3,001,683 A | * | 9/1961 | Goodwin et al. | 229/406 |
| 3,505,031 A | * | 4/1970 | Perkinson et al. | 422/102 |
| 4,026,458 A | * | 5/1977 | Morris et al. | 229/182.1 |
| 4,252,264 A | * | 2/1981 | Herbst et al. | 229/400 |
| 4,606,496 A | * | 8/1986 | Marx et al. | 229/406 |
| 4,878,552 A | * | 11/1989 | Gebo et al. | 177/212 |
| 5,088,640 A | * | 2/1992 | Littlejohn | 229/406 |
| 5,385,260 A | * | 1/1995 | Gatcomb | 229/400 |
| 5,415,339 A | * | 5/1995 | Howard | 229/403 |
| 5,628,451 A | * | 5/1997 | Neary | 229/114 |
| 5,721,022 A | * | 2/1998 | Morita et al. | 428/34.2 |
| 6,237,845 B1 | * | 5/2001 | Hashimoto et al. | 229/400 |
| 6,401,962 B1 | * | 6/2002 | Littlejohn et al. | 220/574 |
| 6,595,409 B1 | * | 7/2003 | Hashimoto et al. | 229/108 |

* cited by examiner

*Primary Examiner*—Randy W. Gibson
(74) *Attorney, Agent, or Firm*—Mark P. White

(57) ABSTRACT

A disposable paper weighing dish that is configured and arranged to hold a substance during weighing. The weighing dish includes at least one sheet of paper with at least one surface that is lubricious and substantially impermeable to finely powdered dry chemicals. The paper material has been shaped with a mechanical forming die to form a self-supporting open dish-shaped structure that includes at least a bottom wall and a raised perimeter sidewall that is continuous with, and surrounds the bottom wall. The perimeter sidewall includes multiple upwardly oriented flutes, in which the lubricity of the paper and the configuration and arrangement of the flutes cooperate to allow a substantially quantitative transfer of the substance following weighing, by sliding the substance with the force of gravity from the weighing dish into a receiving container.

18 Claims, 1 Drawing Sheet

DISPOSABLE PAPER WEIGHING DISHES

BACKGROUND OF INVENTION

This invention relates to a weighing dish made of paper, and a method in which a dry chemical or other dry laboratory material is held in that dish during weighing, and then quantitatively transferred to a receiving container. The weighing dish is fabricated from a lightweight high lubricity paper that allows quantitative transfer of the material after weighing, in which the dish has at least a bottom wall and a surrounding perimeter sidewall that includes pleats or flutes, and is continuous with the bottom wall.

Disposable weighing dish containers have been used for many years to hold materials such as granular chemicals and powders that are being weighed on preparative and analytical balances. Weighing dishes fabricated from plastic or aluminum foil are generally preferred over beakers and flasks for receiving and weighing out chemicals because they are lightweight (allowing use on low weight capacity precision balances) and are shallow, i.e., they have short sidewalls. Therefore, weighing dishes allow convenient and direct access for adding or removing material during weighing. Weighing dishes are generally manufactured under conditions that allow them to remain free of any contaminants. However, there are at least two drawbacks to the use of plastics and metal foils for the fabrication of weighing dishes. These include the build-up of static electricity, and the consequent static cling problem with fine powders that are weighed in plastic dishes, and the problem of particles of material being trapped in the creases typically found in shaped metal foil dishes.

Applicant is unaware of any prior art either in the patent literature, in scientific equipment catalogs or elsewhere relating to the presently invented paper weighing dish. A variety of die-cut and formed paper plates and bowls as well as cut and lap-joined paper trays are available in the food service industry, but most of these containers are either fabricated from unsuitable materials or unsuitably configured for use in the present invention. Applicant finds no suggestion in the literature that pleated paper structures can be adapted for use as disposable weighing dishes in the laboratory. On the worldwide web, numerous sites provide information on plastic and aluminum weighing dishes, but none suggest the existence of paper weighing dishes.

SUMMARY OF INVENTION

It is an object of the present invention to provide an inexpensive weighing dish which has all of the requisites for its intended purpose: namely, it is easy to use, it prevents contamination of the material to be weighed, and it provides for an easy and substantially complete transfer of the material to and from the weighing dish.

It is a further object of the invention that this weighing dish be suitable for use in weighing powders.

In accordance with a first aspect of the invention, the dish and the material to be weighed are used together.

In accordance with a second aspect of the invention, the weighing dish includes at least one paper container with at least one surface that is lubricious and substantially impermeable to finely powdered dry chemicals.

In accordance with a third aspect of the invention, the container has at least a bottom wall and a raised perimeter sidewall continuous with, and surrounding said bottom wall.

In accordance with a fourth aspect of the invention the perimeter sidewall contains a multiplicity of upwardly oriented flutes.

In accordance with a fifth aspect of the invention, the lubricity of the paper and the configuration and arrangement of the flutes cooperate to allow a substantially quantitative transfer of the substance following weighing, by sliding said substance into a receiving container.

In accordance with a sixth aspect of the invention, the weighing dish is sterile.

In accordance with a seventh aspect of the invention, the weighing dish has been sterilized by a process selected from the group consisting of radiation sterilization and gas sterilization.

In accordance with an eighth aspect of the invention, the paper has a slide angle measured in accordance with TAPPI standards of between 8 degrees and 30 degrees.

In accordance with a ninth aspect of the invention, that slide angle is between 10 and 20 degrees.

In accordance with a tenth aspect of the invention, the paper is selected from the group consisting of low friction papers, glazed papers, high slip papers, gloss-finished papers, supercalendered papers and combinations thereof.

In accordance with an eleventh aspect of the invention, the paper is glassine paper.

In accordance with a twelfth aspect of the invention, the paper is between 0.001 and 0.010 inches thick.

In accordance with a thirteenth aspect of the invention, the paper is between 0.001 and 0.004 inches thick.

In accordance with a fourteenth aspect of the invention, the shaping of the weighing dish is produced using a mechanical forming die that utilizes a forming means selected from the group consisting of pressure, heat, and a combination thereof.

In accordance with a fifteenth aspect of the invention, the weighing dish is an open dish-shaped structure selected from the group consisting of tubs, trays, cups, bowls, canisters and other vessels that are free of any structural feature that would interfere with said substantially quantitative transfer of the substance.

In accordance with a sixteenth aspect of the invention, at least a portion of the perimeter sidewall is formed into an exit spout or mouth to facilitate said substantially quantitative transfer of the substance.

In accordance with a seventeenth aspect of the invention, the shape of the bottom wall is either round, oval, square, rectangular, triangular or polygonal.

In accordance with a eighteenth aspect of the invention, the length measured across the largest dimension of said bottom wall is between 1 inch and 6 inches.

In accordance with a nineteenth aspect of the invention, that length is between 1.5 inches and 4 inches.

In accordance with a twentieth aspect of the invention, the height of the perimeter wall is between 0.10 inches and 2 inches.

In accordance with a twenty-first aspect of the invention, the height is between 0.25 inches and 1.5 inch.

In accordance with a twenty-second aspect of the invention, a method of weighing a quantity of dry substance on a weighing instrument includes the steps of placing the weighing dish on the instrument's weighing surface, adjusting the instrument reading to zero and adding a quantity of substance to the weighing dish.

In accordance with a twenty-third aspect of the invention, a method of measuring out a predetermined weight quantity of dry substance on the weighing instrument includes adding or subtracting empirically selected amounts of the substance in said weighing dish until the predetermined weight reading is reached.

In accordance with a twenty-fourth aspect of the invention, the weighing dish, and weighing instrument are provided as a kit for use with the substance to be weighed

BRIEF DESCRIPTION OF DRAWINGS

The invention will be more fully described in the following detailed description in conjunction with the drawings in which.

DETAILED DESCRIPTION

Figure 1:
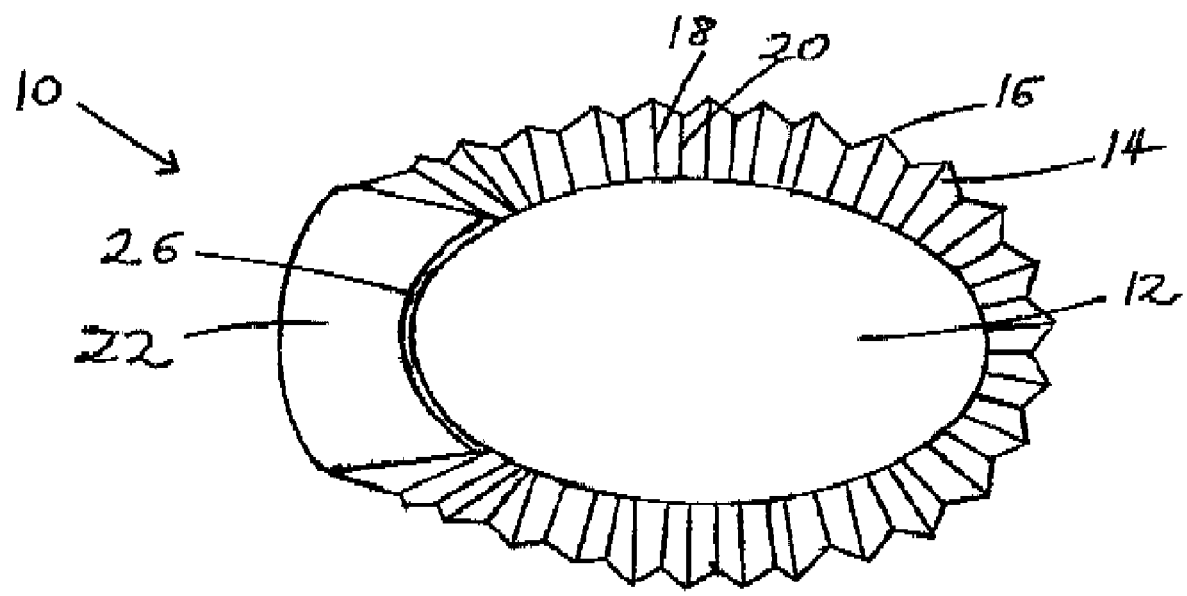
FIG. 1 is a top view of a paper weighing dish of the present invention (prior to addition of a dry chemical), with a non-pleated spout or mouth portion oriented to the left.
Figure 2:
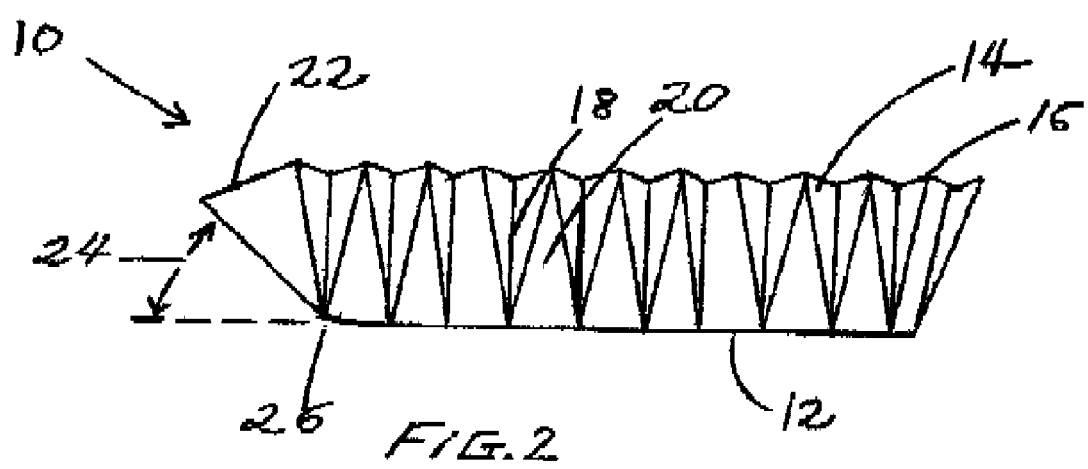
FIG. 2 is a side view of the paper weighing dish depicted in FIG. 1 with the non-pleated spout or mouth portion oriented to the left.
Figure 3:
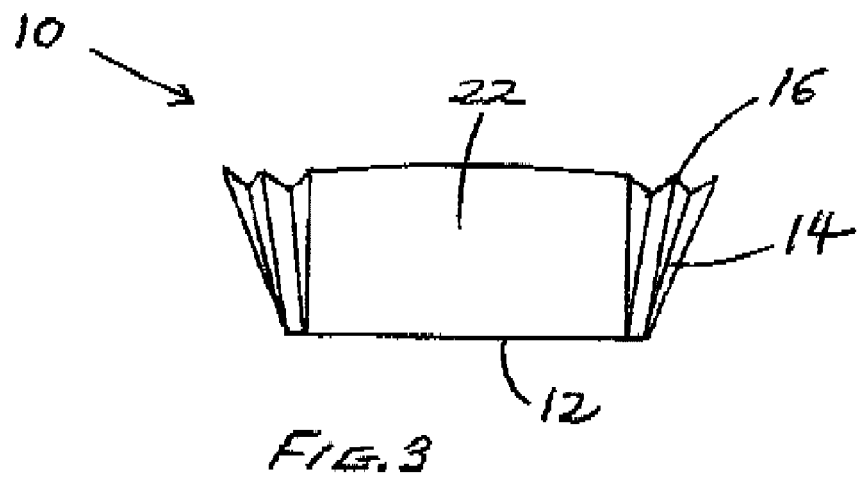
FIG. 3 is a frontal view of the spout or mouth portion of the paper weighing dish depicted in FIG. 1.

This invention concerns a suitably sized and configured disposable paper weighing dish used to weigh a dry chemical or other dry laboratory material held in that dish during weighing, in which the dish is fabricated from a lightweight high lubricity paper that allows quantitative transfer of the material after weighing. The weighing dish has at least a bottom wall and a surrounding perimeter sidewall that includes pleats or flutes, and is continuous with the bottom wall. The dish is fabricated in the form of an open cup using a three dimensional shape-forming die, from a sheet of paper having a low coefficient of friction using a pleating process employing substantial pressure and heat, rather than by a process of assembly that would involve adhering or attaching together separate pieces of paper(s). The paper weighing dish has at least a bottom wall and a surrounding perimeter sidewall that is formed with upwardly oriented pleats. The inward facing surface of the dish, and in particular the concave-inward portions of the pleats are preferably configured to minimize any retention of weighed material as the material is transferred by sliding it from the dish to a receiving container.

In the prior art of manufactured paper products, pleated paper liners made from single sheets of paper, are filled with muffin batter and baked. Also, pleated paper coffee filters are widely used in brewing coffee. Further, pleated paper liners are commonly used for packaging candies. Most of these liners are poorly suited for use in the present invention. For example, many paper surfaces fail to fully release dry powders. Many other lightweight papers pleated into cup-shaped liners under pressure and/or heat, have V-shaped pleats that close up on themselves when the cup is handled. These pleats tend to trap fine powders that have been placed in these containers.

Most laboratory workers are familiar with weighing dishes that have been thermoformed from either thin plastic sheet, e.g., 10–12 mil thick (0.010–0.012 inch) polystyrene, rubberized polystyrene or polyolefins (polyethylene or polypropylene), or that have been cut and formed from thick aluminum foil (see Fisher Scientific Catalog 2002/03, page 100). It is important that weighing dishes remain substantially free of static electricity which can alter readings on precision balances (balances having milligram and sub-milligram weight sensitivities). For the purpose of transferal, it is also important for any dry material in a weighing dish to slide freely out of the dish when the dish is tilted into a receiving container. Surface friction or any attractive force between a weighing dish and, for example, a fine powder can interfere with quantitative transferal of the powder. Applicant has observed that while plastic weighing dishes are easy to manipulate, they are susceptible to static electricity. Sometimes it is unclear whether the dish is statically charged or whether a dry powder placed in the dish is carrying the charge, but in either case, the static electricity tends to cause fine powders to move unpredictably and/or cling to the inside surface of the weighing dish during powder transfer to a receiving container following weighing. In addition, static electricity tends to cause weighing errors due to fluctuations in the weight readings on sensitive balances. By contrast, paper weighing dishes exhibit little or no build-up of static electricity, and powder transfer is facilitated.

Applicant has found that weighing dishes fabricated from aluminum foil have their own problems. While static electricity may not be the cause, Applicant has observed that fine powders such as light-weight fumed silica particles can cling to aluminum foil weighing dishes. An aluminum dish also tends to be more expensive than plastic and it may react with certain chemicals. Furthermore, aluminum weighing dishes are typically formed by stamping, and this process leaves problematic creases in the dish sidewalls that can trap fine powdered chemicals that are being weighed. Paper weighing dishes do not have this problem. In addition, while both aluminum and plastic weighing dishes are considered "disposable items", many people find it wasteful to discard metals and plastics and would prefer to discard a paper dish since it is made from a renewable resource.

For weighing small amounts of material, e.g., milligram to gram amounts of materials, flat sheets of glassine-type paper (known in laboratories as weighing paper or powder paper) have been available for many years (see Fisher Scientific Catalog 2002/03, page 100). Typical sheets of weighing paper are between 3×3 inches and 6×6 inches in size and have a thickness of approximately 1 mil (0.001 inches). However, the amount of material that can be safely placed on a sheet of weighing paper is very limited, and if overloaded there is a substantial risk of spilling the material during transfer due to the flexibility of such thin flat sheets. A sudden air draft may also cause an accidental loss of material from a flat sheet of weighing paper.

Using a very lightweight powder material for testing (fumed silica, M5 Cabosil© grade, obtained from the Cabot Corporation, Tuscola, Ill.), Applicant has compared the powder release properties of commercially manufactured weighing dishes fabricated from polystyrene and aluminum foil, as well as flat sheets of glassine weighing paper (all obtained from Fisher Scientific, see above). After placing 0.5 gram of the fumed silica on these different surfaces, each was tilted vertically. A substantial powder coating remained attached to the polystyrene and aluminum weighing dish surfaces but not to the glassine weighing paper. To benefit from this superior release property of glassine paper and to increase the weighing capacity of glassine paper, Applicant proposed the fabrication of glassine paper containers. To avoid any seams or discontinuities in the paper that could retain powder and for cost efficiency, weighing dishes were designed, employing a single sheet (or even a multi-layer sheet) of pleated glassine paper. Most importantly, at least one of the two surfaces of the paper, must have a sufficient degree of lubricity to allow fine powdered laboratory reagents to slide off the paper surface easily when the weighing dish is tilted upward during transfer of the reagent or other material to a receiving container.

Accordingly, this invention relates to the configuration, size, choice of material and laboratory use of disposable paper weighing dishes for holding and subsequently facilitating the quantitative transfer of weighed material to a receiving container. More specifically, the invention concerns paper weighing dishes with pleats and/or creases that are formed using a die under pressure and typically heat (300–350∞F), from sheets of FDA-approved (suitable for direct food and direct pharmaceutical product contact), high-lubricity "powder paper." Such paper can be a cellulosic paper, a mixed cellulosic paper, or even a synthetic or mixed synthetic paper that is essentially free of any foreign chemicals that could even minutely change, react with, dilute, or otherwise alter the chemical composition of a substance being weighed. Accordingly, a waxed paper that would be suitable for kitchen and food use, could upon cutting and pleating, release small paraffin fragments into a substance being weighed and would not be suitable for use herein. Likewise, a paper with traces of residual bleaching agents could react with a substance being weighed would not be satisfactory. A powder paper and, in particular, a high-lubricity low-friction powder paper is a paper having good powder release properties, i.e., fine powders slide off freely under the force of gravity, such as a glassine paper or a siliconized paper. The dish, including its pleated sidewalls, must have adequate rigidity to support substantial amounts (multi-gram quantities) of solid materials placed inside, and the paper must be essentially impermeable and non-adherent to fine dry powders. In this manner, quantities of powders and other materials can be placed in a paper weighing dish, weighed on a balance, and quantitatively transferred from the paper dish by tilting the dish and sliding the powder into a receiving vessel under the force of gravity.

In essence, the paper weighing dish has some of the desirable properties of the prior art glassine weighing paper as well as the plastic and metal weighing dishes, without any of their disadvantages described above. For example, a paper weighing dish formed from 2–4 mil thick glassine paper has the capacity to hold just as much material as a plastic weighing dish, yet it has less tendency to undesirably retain fine powders during transfer (via static electricity). The paper dish is also thinner and less expensive to fabricate than plastic dishes that are typically 10–12 mil thick. Moreover, as a disposable item principally fabricated from a renewable resource, many people would prefer to discard a paper weighing dish than a plastic or metal product.

With regard to the method of manufacture, the presently invented paper weighing dishes are fabricated with the same equipment and methods used to form paper liner cups used in muffin baking pans and used in forming and holding chocolates candies, for example. More specifically, a forming die capable of being operated under pressure and also preferably heated during its regular operation is designed and tooled with a particular geometric shape corresponding to the weighing dish. For example, a stainless steel die may be shaped to produce a round, oval, polygon or other shape of dish or cup. The die is typically heated during its cycling operation, and it can process a stack or nest of multiple paper sheets at one time so that many (e.g., 10–20) paper weighing dishes are cost-effectively produced during each cycling of the tool. The paper sheet material, e.g., glassine paper, is suitably selected so that the multiple sheets will not adhere to one another during the compression and heating process that may be employed in shaping such paper dishes or cups. The consumer (or in the present case, the laboratory worker) is able to easily separate individual paper dishes from the nested stack at the time of use.

A wide variety of weighing dish shapes can be designed within the spirit of the present invention. Preferred shapes for the presently invented weighing dish are as follows: A dish is formed with a generally round or oval shaped bottom wall or base, and a generally upward sloping, if not essentially vertical sidewall. The diameter or major axis of the round or oval base may range from approximately one inch to six inches in size while the height of the sidewall that extends around the perimeter of the bottom of the dish measures between 0.25 and 1.5 inches. The sidewall includes a series of upwardly sloping, i.e., not quite vertical, flutes or pleats. It is preferable that at least the concave-inwardly facing portion of each flute or pleat is formed with a generally rounded cross-section or U-shape, rather than a sharply folded or V-shaped pleat in the paper. When powders are being weighed and subsequently transferred from the paper dish (by sliding out the powder), these rounded flutes have little tendency to retain remnants of powder. On the other hand, if the concave-inwardly facing portion of each pleat is sharply V-shaped with little radius of curvature, these pleats tend to undesirably retain residues of powder in the paper folds. By contrast, the convex-inwardly facing portion of each pleat cannot trap such residues, and its shape has little impact on powder retention.

With regard to the width and depth of the individual flutes, there can be a considerable degree of latitude as long as the U-shaped contour is maintained. For example, the design of one useful weighing dish incorporates flutes whose depth (measured horizontally and radially from the flute's peak to its valley) is only approximately 1/16 inch, while the periodicity or distance between adjacent the flutes (measured by the flute peak to peak distance around the circumference of the dish) is approximately 3/16 inch. The design of another useful weighing dish incorporates flutes whose depth is approximately 1/8 inch, while the distance between adjacent the flutes is also approximately 1/8 inch.

As an additional design feature for elongated or oval-shaped paper dishes, a section of the sidewall at one or both of the ends of the oval may be contoured to form a smooth pouring spout. The spout is simply a section of the sidewall that extends upward and outward at an oblique angle from the horizontal base of the weighing dish, and whose surface is formed with shallower pleats or no pleats at all. This spout facilitates the transfer of a material (such as a powder) into a flask, beaker, or other receiving vessel. These and other features are shown in FIG. 1.

A preferred type of paper for fabricating the weighing dishes of the present invention is glassine. Glassine is commonly defined as a paper manufactured from a finely ground chemical wood pulp that is largely greaseproof but does not have wet strength. The paper pulp for glassine is typically beaten in a smaller proportion of water than is natural tracing paper. The paper typically contains little if any sizing and may contain no fillers. A high gloss semi-transparent glassine paper is produced through very intense calender treatment (smoothing between rollers) and drying. Glassine is often used as chocolate wrapping, in photo albums, wrapping for fish preservatives, protective covers for leaflets, envelope windows etc.

With a paper material such as glassine, the heated die forms creases and/or pleats that have adequate persistence for the purpose of this invention. These creases and/or pleats add rigidity to the dish above that of the original non-folded sheet of paper. Like a baking cup, when the perimeter portion of a paper circle or oval is bent upward to form the sidewall of the weighing dish, the surplus paper is accommodated within substantially vertical pleats around the sidewall of the paper weighing dish.

Applicant has observed that sharply angled pleats without an adequate radius of curvature for use in the present invention are often present in paper baking cups. These sharp pleats may be undesirable in weighing dishes because powders that may be weighed can become trapped in these pleats. Consequently, the paper-forming die for the weighing dish may be preferably machined with "open angled" pleats that empirically have little tendency to trap granular and powdered materials. An open angled pleat can be produced by forming a pleat whose interior angle is at least 60° and preferably approximately 90° or more.

Empirically, it has been discovered that a portion of the circumference of a round, oval or polygon-shaped paper weighing dish can be formed with a smooth rather than a pleated surface. This smooth portion can still be formed so to maintain an upward elevation angle to contain solids. The smooth portion is most useful as a "pouring spout" to facilitate the complete exiting, i.e., sliding and quantitative transfer, of material from the weighing dish to a receiving vessel. In the case of a round paper weighing dish, this smooth portion or spout can be as much as ¼, i.e., a 90° portion of the circumference.

The choice of paper (including its composition, its finish, as well as its thickness) are parameters that influence the functionality of the final paper weighing dish. The size and shape of the dish as well as the shape of the pleats used in the dish are other parameters that influence the overall utility of the resulting product.

INVENTION

Definitions

As used in this description and the accompanying claims, the following terms shall have the meanings indicated, unless the context otherwise requires.

:The term "sterile as used herein means maintained substantially free from microbial contamination.

The term assembly as used herein, refers to a combination of different physical elements. In the present invention, the assembly is a combination of two elements, i.e., a paper weighing dish (container) and a dry chemical substance, biological material or other dry material that can be safely placed inside, and rest inside this container while it is weighed on an instrument such as a weighing balance. After weighing, the contents of the weighing dish are quantitatively transferred into a receiving vessel. This transfer is easily accomplished by tilting the paper weighing dish and allowing its contents to slide out into a receiving container.

The term "dry substance" as used herein refers to any dry material that can be weighed in a paper weighing dish, including but not limited to chemical materials, biological materials, foods and nutrients, inert physical materials, objects, minerals, and any other material that does not attack the paper material used in the dish.

The phrase "configured and arranged to hold said substance" as used herein describing the dish refers to all of the structural design elements and physical dimensions of these elements that are chosen so that the dish functions as intended.

The term "at least one sheet of paper" as used herein means that a paper weighing dish could, in principle, be formed from more than one sheet of paper by, for example, laminating two or more layers of paper together.

At least one of the surfaces, i.e., at least the inner facing surface of the dish that will contact the weighed substances, must be "lubricious and substantially impermeable to finely powdered dry chemicals The term "lubricious" means that the paper surface is slippery enough with regard to dry substances placed on this surface, that the dry substances are freely and completely released from the paper when it is tilted, all within the context of this invention; that is, for a short period of time, ranging from several seconds to a minute or so, sufficient to effect the weighing. It is preferable that this release occurs by the time (or before) the bottom wall of the weighing dish has been tilted downward from the horizontal, towards the receiving container at a 45 or 60 degree angle With slightly moist substances or very low density, light-weight substances, a gently tapping may be required to cause the release of the substance from the paper even when it is tilted, but this is rare. Preferred degrees of lubricity are described by slide angles (see below).

The phrase "substantially impermeable to finely powdered dry chemicals" as used herein means that the paper selected for fabricating the dishes has been adequately rolled (e.g., supercalendered) and otherwise surface-treated during manufacture to prevent fine powders from entering pores in the paper. This definition must also be interpreted within the context of the invention; that is, the fine powders must be prevented from entering the pores of the paper for the period of several seconds to a minute or so during which weighing take place. "Substantially impermeable does not imply that powders could not be forced to enter the pores of the paper given sufficient pressure, exerted over sufficient periods of time. Such entry would prevent the quantitative transfer of the substance from the paper following weighing. Applicant routinely uses fumed silica powder (e.g., M-5 grade fumed silica from the Cabot Corporation, Illinois) as a substance representing a "finely powdered dry chemical" to test a paper's ability to freely release such substances. Fumed silica is also very lightweight and has a tendency to accept static electrical charges making it an excellent test material.

The term "mechanical forming die" as used herein refers to the standard dies that are used to form pleated paper dishes, liners, and the like. These dies are typically steel dies consisting of male and female elements, in which multiple sheets (e.g., 10–20 sheets) of paper are fed between these elements before they are forced together under pressure and heat to form a nest of multiple paper dishes. The resulting nested paper dishes are usually separated at the time of use.

The term "self-supporting" as used herein to describe the "open dish-shaped structure" refers to the ability of the perimeter walls of the dish to freely stand without sagging or collapsing. Indeed, the self-supporting perimeter walls of the dish have sufficient rigidity and strength to support typical chemical powders that are loaded into the dishes during weighing and after weighing as the contents of the dish are transferred to a receiving container.

The terms "bottom wall" and a "raised perimeter sidewall" as used herein are used to name and describe the principal structural portions of the paper weighing dish described herein. The bottom wall is generally flat so that it can be rested horizontally and flat on the flat pan of a weighing instrument, i.e., on a balance. On the other hand, the raised perimeter wall that bends or curves upward from the bottom wall is contiguous (and continuous, i.e., there is no special interruption between these structural portions) is oriented upward at an angle of elevation of between approximately 70 and 90 degrees. This elevation angle is stabilized by the multiple pleats or flutes that are formed with pressure and heat in this perimeter wall by the forming die.

The flutes herein are described herein as "multiple" in number and "upwardly oriented." Depending upon the size and geometry of the weighing dish, multiple can mean 4 or 200 or any number in between. The function of the flutes is to accommodate the surplus area of paper resulting from forming the upwardly oriented perimeter sidewall of the weighing dish from a flat sheet of paper. The flutes also serve to stiffen the sidewall of the dish, and this feature facilitates the manual handling and carrying of the dish when it is filled with material that is weighed and subsequently transferred to a receiving container.

The term "upwardly oriented" with respect to the flutes is meant to indicate that the flutes or pleats in the perimeter sidewall are generally oriented up and down rather than horizontally or parallel to the bottom wall of the dish.

A concept of coordinated function is described in which the "lubricity" of the paper used to fabricate the weighing dish and the "configuration and arrangement of the flutes cooperate" to allow a substantially quantitative transfer of the weighed substance from the weighing dish to a receiving container. Applicant has found that it is not sufficient for the paper to be slippery, since narrow V-shaped pleats can still cause powders to be trapped in these pleats. In other words, for a substance to freely slide out of the weighing dish, the paper surface must be slippery and the flutes (also termed pleats) must be suitably open so that they freely release a powder when the dish is tilted. Thus, it is preferred that the hollow or concave-inward portion of each flute or pleat (on the sidewall facing the inside of the dish) is formed with a U-shape rather than a V-shape, since powders are less likely to be trapped in a U-shaped groove. If the groove is formed with a generally V-shaped geometry, then it is preferable at least, that the bottom of the groove is formed with a radius of curvature sufficient to release granules and powders being weighed. Suitable dimensions for these radii, for the numbers, depths and spacings of the flutes, and suitable shapes for the flutes can be determined by those skilled in the art of paper-forming die design. For example, one weighing dish formed with short sidewalls (approximately 0.5 inches tall) has flutes that are spaced at 0.2 inch intervals around the circumference, and the peak to valley depth of the flute is only 0.06 inches. This dish with barely discernable flutes is very easily emptied of a fine powder after it is gently bent and tilted (bending to curve the bottom wall to form a sliding channel). On the other hand, the same diameter weighing dish with taller walls (1.25 inches) has similarly spaced flutes but more paper must be accommodated in the flutes, and their depth (from peak to valley) is considerably greater (0.12 inches). While this dish can also be easily emptied of fine powders by gently bending and tilting the dish, there is a greater tendency for a flowing powder to temporarily stop in the deeper flutes. In general, flutes that are shallower, wider and U shaped are preferred over deeper, narrower and V-shaped flutes or pleats.

Since some of the substances being weighed are sterile, and it may be important that these substances are maintained free from microbial contamination during weighing, it is desirable that the weighing dishes of the present invention are sterilized following fabrication using one of the conventional methods that include cobalt-60 irradiation and ethylene oxide gas sterilization, for example.

As indicated above, for the quantitative transfer and full release substances from the upper surface of the weighing dish (i.e., the surface holding weighed material) it is critical that at least one of the two surfaces of the paper have adequate lubricity. For the purposes of the present invention, this lubricity may be quantitated by the "slide angle" measured in accordance with TAPPI (Technical Association of the Pulp and Paper Industry) test method T-542. The coefficient of friction may be calculated from the tangent of this slide angle. For release of a wide variety of substances that are weighed, the slide angle should fall between 8 degrees and 30 degrees. In preferred embodiments, that the paper has a slide angle of between approximately 12 and 25 degrees. For weighing and transferring low density, high surface area materials, a high lubricity paper having a slide angle of between approximately 10 and 15 degrees may be more preferred.

In order to achieve an adequate degree of lubricity, the weighing paper is generally selected from the group of papers having a very smooth surface. These include low friction papers, glazed papers, high slip papers, gloss-finished papers, supercalendered papers and combinations thereof.

In particular, glassine paper is a preferred type of paper, and is typically manufactured by a method known to those in the art as supercalendering.

For optimal utility, a paper weighing dish should have sufficient rigidity to maintain shape when, for example, the dish is filled with a dry powdered substance. At the same time, the dish should have sufficient flexibility, allowing it to be bent into a U-shape to help channel and funnel the substance, and thereby facilitate transfer of the substance into a receiving container. Empirical testing has shown that this can be achieved using papers between 0.001 and 0.010 inches thick. Preferably, the paper is between 0.001 and 0.004 inches thick. In particular, glassine paper that is between 0.001 and 0.003 inches thick is very useful.

The equipment required for manufacturing fluted paper cups is well known in the art, and is easily adapted for manufacturing weighing dishes of the present invention. As in the prior art, a mechanical forming die is used, consisting of male and female elements fabricated from steel, preferably stainless steel. A combination of pressure and heat is applied to the elements of the die, thereby forming the paper into the shape of the weighing dishes. For efficiency, it is common practice for 10–20 sheets of paper to be fed into the die at the same time, resulting in a nest or stack of dishes that are separated and used one by one. The lubricity of the paper (small slide angle) aids in separating the dishes at the time of use.

Depending upon the particular application, the weighing dish may be formed into almost any open dish shape including, for example, tubs, trays, cups, bowls, canisters and other vessels providing they are free of any structural feature that would interfere with a substantially quantitative transfer of the substance being weighed. The term "substantially quantitative transfer" as used herein means that greater than 99% and preferably greater than 99.9%, and most preferably greater than 99.99% of a dry material placed in the weighing dish can be transferred out of the dish by tilting the dish and sliding the material out, or by gently tapping on the back side of the dish to start the sliding process.

When it is feasible to design a specialized die for fabricating weighing dishes for handling granular and powdered substances, a portion of the perimeter sidewall can be modified to create a particularly smooth "exit spout or mouth". If the weighing dish has one or more narrower portions resulting from an oval design (see FIG. 1), for example, then the spout would be located at one of the narrow ends because the dish would tend to funnel, and material would flow along its major axis. More specifically, the term exit spout or mouth refer to a portion of the sidewall being structured differently from the adjoining sidewall as per one or more of the following criteria: (i) having a modified pleat structure, e.g., left non-pleated (or containing some shallower pleats), or having fewer but wider and/or more open pleats, (ii) having a modified sidewall shape, e.g., sidewall angled outward or inward, or extended or shortened in length (relative to the adjacent sidewall), or sculpted or shaped to help funnel substances from the dish. These features are intended to facilitate the quantitative transfer of substances from the dish.

Any of a variety of geometric shapes may be selected in designing the bottom wall of the weighing dish. These shapes include round, oval, square, rectangle, triangle and multi-sided polygon, e.g. pentagon, hexagon, octagon.

The height of the perimeter sidewall that extends around the bottom wall determines, in part, how much material can be loaded into the weighing dish. Depending upon the weighing application, the die can be varied to form perimeter sidewalls of different heights varying between approximately 0.10 inches and 2 inches. Preferred perimeter sidewall heights generally range between 0.25 inches and 1.5 inch.

Referring to the Figures, generally oval-shaped paper weighing dish 10 (overall length approximately 4.3 inches, width 2.5 inches, and height 1.0 inches) is designed to hold between approximately 50 milligrams and 50 grams of dry material such as a chemical powder or dry biological nutrient concentrate. Referring to FIG. 1, weighing dish 10, formed by a male and female stainless steel die pair (not shown) that exert pressure and heat to sheets of paper fed into the forming die can be fabricated from a high lubricity 40 pound glassine paper having a thickness of approximately 0.0025 inches and a TAPPI slide angle of approximately 15 degrees. Weighing dish 10 includes a bottom wall 12 that is substantially planar for resting on a weighing balance, and a perimeter sidewall 14 that is continuous with, surrounds, and extends upwardly from bottom wall 12. Perimeter sidewall 14 includes flutes or pleats 16 that are generally oriented up and down rather than horizontally. Each of these flutes includes a concave inward portion 18 and a convex inward portion 20. These portions successively alternate around the dish. A spout or mouth 22 that is relatively smooth and preferably uninterrupted by flutes or pleats is formed in the perimeter sidewall 14 at one of the ends of the oval. This spout establishes an angle 24 of approximately 45∞ elevation above the horizontal. The spout 22 forms a continuous curved surface with the bottom wall 12 through a radius of curvature 26 of approximately ¼ inch (rather than meeting at a fold) so as to eliminate any tendency of finely powdered substances to accumulate at such a fold. Similarly, rather than being formed with sharp folds, it is preferred that the multiple pleats 16 in the sidewall 14 are formed with at least a small radius of curvature to prevent fine dry powders from lodging in these folds.

All patents and publications mentioned in the specification are indicative of the levels of skill of those skilled in the art to which the invention pertains. All references cited in this disclosure are incorporated by reference to the same extent as if each reference had been incorporated by reference in its entirety individually.

One skilled in the art would readily appreciate that the present invention is well adapted to carry out the objects and obtain the ends and advantages mentioned, as well as those inherent therein. The specific methods and compositions described herein as presently representative of preferred embodiments are exemplary and are not intended as limitations on the scope of the invention. Changes therein and other uses will occur to those skilled in the art which are encompassed within the spirit of the invention are defined by the scope of the claims.

It will be readily apparent to one skilled in the art that varying substitutions and modifications may be made to the invention disclosed herein without departing from the scope and spirit of the invention. For example, those skilled in the art will recognize that the invention may suitably be practiced using any of a variety of sources of material, e.g., diverse cellulosic papers, synthetic papers and mixed papers to fabricate the paper weighing dishes, and any one of a variety of dish shapes, sizes and contours besides a simple round cup-shaped dish that corresponds in size to the weighing pan of a common weighing balance, e.g., 3.5 inches in diameter.

The invention illustratively described herein may be suitably practiced in the absence of any element or elements, limitation or limitations which is not specifically disclosed herein. Thus, for example, in each instance herein any of the terms comprising, consisting essentially of and consisting of may be replaced with either of the other two terms. The terms and expressions which have been employed are used as terms of description and not of limitation, and there is not intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group. For example, if there are alternatives A, B, and C, all of the following possibilities are included: A separately, B separately, C separately, A and B, A and C, B and C, and A and B and C. Thus, the embodiments expressly include any subset or subgroup of those alternatives, for example, any subset of the types of paper materials used to fabricate the container. While each such subset or subgroup could be listed separately, for the sake of brevity, such a listing is replaced by the present description.

While certain embodiments and examples have been used to describe the present invention, many variations are possible and are within the spirit and scope of the invention. Such variations will be apparent to those skilled in the art upon inspection of the specification and claims herein. Other embodiments are within the following claims.

The invention claimed is:

1. A method of weighing a quantity of dry substance on a weighing instrument, comprising the steps of:
   providing a paper weighing dish with at least one surface that is lubricious and substantially impermeable to finely powdered dry chemicals, wherein said container comprises a bottom wall and a raised perimeter sidewall continuous with, and surrounding said bottom wall, wherein said perimeter sidewall comprises a multiplicity of upwardly oriented flutes;
   placing said weighing dish on a weighing surface of said instrument;

optionally adjusting an instrument's weight reading to zero;

adding said quantity of dry substance to said weighing dish; and effecting a substantially quantitatively transfer of said substance by sliding said substance into a receiving vessel.

2. The method of claim 1 wherein said weighing dish is sterile.

3. The method of claim 2 wherein said weighing dish has been sterilized by a process selected from the group consisting of radiation sterilization and gas sterilization.

4. The method of claim 3 wherein said paper has a slide angle measured in accordance with TAPPI standards of between 8 degrees and 30 degrees.

5. The method of claim 4 wherein said a slide angle is between 10 and 20 degrees.

6. The method of claim 1 wherein said paper is selected from the group consisting of low friction papers, glazed papers, high slip papers, gloss-finished papers, supercalendered papers and combinations thereof.

7. The method of claim 1 wherein said paper is glassine paper.

8. The method of claim 1 wherein said paper is between 0.001 and 0.010 inches thick.

9. The method of claim 8 wherein said paper is between 0.001 and 0.004 inches thick.

10. The method of claim 1 wherein the shaping of said weighing dish is produced using a mechanical forming die that utilizes a forming means selected from the group consisting of pressure, heat, and a combination thereof.

11. The method of claim 1 wherein said weighing dish is an open dish-shaped structure selected from the group consisting of tubs, trays, cups, bowls, canisters and other vessels that are free of any structural feature that would interfere with said substantially quantitative transfer of said substance.

12. The method of claim 1 wherein at least a portion of said perimeter sidewall is formed into an exit spout or mouth to facilitate said substantially quantitative transfer of said substance.

13. The method of claim 1 wherein the shape of said bottom wall is selected from the group consisting of round, oval, square, rectangle, triangle and polygon.

14. The method of claim 13 wherein the length measured across the largest dimension of said bottom wall is between 1 inch and 6 inches.

15. The method of claim 14 wherein said length is between 1.5 inches and 4 inches.

16. The method of claim 1 wherein the height of said perimeter wall is between 0.10 inches and 2 inches.

17. The method of claim 16 wherein said height is between 0.25 inches and 1.5 inch.

18. A method of measuring out a predetermined weight quantity of dry substance on a weighing instrument, comprising carrying out the steps of claim 1 but substituting for said adding step, the step of adding or subtracting empirically selected amounts of said substance in said weighing dish until the predetermined weight reading is reached.

* * * * *